3,338,971
STABILIZED N,N-DIALKYLHYDROXYLAMINE AQUEOUS SOLUTIONS

Harry E. Albert and Paul Gordon Haines, Lafayette Hill, Pa., assignors to Pennsalt Chemicals Corporation, Philadelphia, Pa., a corporation of Pennsylvania
No Drawing. Filed May 25, 1964, Ser. No. 370,094
8 Claims. (Cl. 260—583)

This invention relates to improve N,N-di-lower alkylhydroxylamine compositions having improved storage stability. More particularly, the invention is concerned with aqueous N,N-di-lower alkyldroxylamine solutions stabilized against decomposition during storage.

N,N-di-lower alkylhydroxylamines are known to have a variety of uses. For example, they inhibit the polymerization of styrene monomer during transport and storage of styrene prior to its use and they act as shortstops in the preparation of synthetic rubber, such as styrene-butadiene rubber. Further, as disclosed in the application of Harry E. Albert, S.N. 216,764, now U.S. Patent 3,148,225 they inhibit the formation of popcorn polymer which occurs in the recovery systems of synthetic rubber manufacturing plants.

When sold in commerce, the dialkylhydroxylamines are generally made available as concentrated aqueous solutions, usually on the order of at least about 85% by weight. Such solutions are then diluted with water for use. In shortstop applications, for example, the dilute solutions which are added to the polymerization system generally contain on the order of 0.1 to 0.5% by weight of di-lower alkylhydroxylamine. These dilute solutions are made up and then used over a prolonged period of time and it has been observed that the dilute solutions of the di-lower alkylhydroxylamine are not stable to storage. It has now been found, by means of this invention, that such dilute aqueous solutions of N,N-di-lower alkylhydroxylamines may be protected against storage instability by adding a water soluble, N,N-di-lower alkyldithiocarbamate salt to the solution.

A further embodiment of this invention is to provide storage stable concentrated aqueous solutions of N,N-di-lower alkylhydroxylamines containing N,N-di-lower alkyldithiocarbamates as stabilizers. Such concentrated solutions are useful articles of commerce in that they permit sale of a concentrated solution which, when diluted at the point of use, will provide a storage stable dilute solution.

The N,N-di-lower alkylhydroxylamine solutions which are stablized in accord with this invention will be those N,N-di-lower alkylhydroxylamines containing from one to six carbon atoms in each alkyl group. These include such compounds as N,N-dimethylhydroxylamine; N-methyl-N-ethylhydroxylamine; N,N-diethylhydroxylamine; N,N-di-n-propylhydroxylamine; N,N-di-n-butylhydroxylamine; N,N-di-isobutylhydroxylamine; N,N-diamylhydroxylamine; N,N-di-n-hexyldroxylamine; and the like. In the following discussion and examples, N,N-di-ethylhydroxylamines, but it will be understood that the process and the compositions described by this invention are operable with the other members of the class as exemplified above.

The water soluble N,N-di-lower alkyldithiocarbamates which are useful as stabilizers in this invention will be selected from those containing from one to four carbon atoms in the lower alkyl group, and these alkyl groups may be the same or different Thus, for example, useful agents will include N,N-dimethyldithiocarbamate; N,N-diethyldithiocarbamate; N,N-diisopropyldithiocarbamate; N-methyl-N-ethyl-dithiocarbamate; N,N-dibutyldithiocarbamate and the like. As indicated, the dithiocarbamates will be used in the form of their salts and preferably the alkali metal salt such as the lithium, sodium, potassium, cesium and rubidium salts will be employed. Preferably, because of availability and cost, the sodium salt of dimethyl- and diethyldithiocarbamate will be preferred. In addition to using the alkali metal salts, however, other water soluble salts such as ammonium salts and lower alkylamine salts will also be employed as, for example, methylammonium salts, dimethylammonium salts, diethylammonium salts, isopropylammonium salts, dipropylammonium salts, dibutylammonium salts and the like. It is also to be understood that dithiocarbamates may be formed in situ and, in fact, the N,N-di-lower alkylhydroxylamine may be used as a reactant for dithiocarbamate formation. It is known in the art (Ber. 37, 3228 (1904)) that N,N-dialkylhydroxylamines will react with carbon disulfide to form sulfur and dialkylamine. When $CS_2$ is added to the N,N-di-lower alkylhydroxylamine solution the dialkylamine formed reacts with additional $CS_2$ to form dithiocarbamate. Thus, $CS_2$ may be used as a dithiocarbamate precursor to stabilize N,N-di-lower alkylhydroxylamine solutions in accord with this invention.

The amount of dithiocarbamate that will be used as a stabilizer for the hydroxylamine will generally range from about 0.05 to about 5% by weight of the hydroxylamine content of the solution. The preferred range of dithiocarbamate will be between about 0.1% and about 2%.

The following examples will serve to more fully illustrate the nature of the invention. In the examples and tables the amounts of dithiocarbamate added is given in percent by weight of the hydroxylamine.

Example 1

To an 87% by weight aqueous solution of N,N-diethylhydroxylamine there is added 1% of diethylammonium diethyldithiocarbamate. This solution is stable to storage and shipping and can be diluted prior to use when so desired by the user. The dilute solution is also stable to storage.

Example 2

To an 87% by weight aqueous solution of N,N-diethylhydroxylamine 0.1% of sodium dimethyldicarbamate is added as a 40% by weight aqueous solution. This N,N-diethylhydroxylamine solution is stable to storage and shipping and, when used by the rubber manufacturer, is simply diluted with water to reduce the concentration of N,N-diethylhydroxylamine to about 0.1 to 1% by weight, the dithiocarbamate concentration being reduced accordingly. The dilute solution is then ready for use as a stopping agent for polymerization. The dithiocarbamate is compatible with synthetic rubber systems and there are no problems associated with its use.

Example 3.—Evaluation of dithiocarbamate stabilizers

Evaluation of the stabilizers is accomplished by means of accelerated aging tests which are accomplished by holding treated and untreated solutions at slightly elevated temperatures for a period of time. The method for determining the amount of N,N-diethylhydroxylamine is that based on the procedure described in "Pharmaceutical Analysis" edited by Higuchi and Brockmann-Hanssen, Interscience Publishers, 1961, page 72 which employs alkaline triphenyltetrazolium chloride for colorimetric analysis. The following tables indicate the conditions used and the results obtained:

TABLE I.—STABILIZATION OF DILUTE AQUEOUS SOLUTIONS OF N,N-DIETHYLHYDROXYLAMINE (DEHA) WITH VARIOUS DITHIOCARBAMATE SALTS

| Additive (Based on wt. of DEHA) | Initial percent DEHA | Hours Soln. held at 35° C. | Percent DEHA After Test |
|---|---|---|---|
| A Blank | 0.300 | 138 | 0.135 |
|  |  | 336 | 0.030 |
| 1% Sodium dimethyldithiocarbamate | 0.300 | 138 | 0.303 |
|  |  | 336 | 0.276 |
| 1% Diethylammoniumdiethyldithiocarbamate | 0.348 | 138 | 0.347 |
|  |  | 336 | 0.313 |
| B Blank | 0.47 | 168 | 0.03 |
|  |  | 384 | 0.02 |
| 1% Diethylammoniumdiethyldithiocarbamate | 0.53 | 168 | 0.47 |
|  |  | 384 | 0.42 |
| 0.5% Diethylammoniumdiethyldithiocarbamate | 0.56 | 168 | 0.55 |
|  |  | 384 | 0.50 |
| C Blank | 0.37 | 744 | 0.04 |
| 0.25% Diethylammoniumdiethyldithiocarbamate | 0.50 | 744 | 0.43 |
| 0.10% Diethylammoniumdiethyldithiocarbamate | 0.52 | 744 | 0.43 |
| 0.04% Diethylammoniumdiethyldithiocarbamate | 0.51 | 744 | 0.07 |
| D Blank | 0.786 | 1,128 | 0.090 |
| 0.1% Sodium dimethyldithiocarbamate | 0.830 | 1,128 | 0.77 |
| 0.1% Potassium dimethyldithiocarbamate | 0.933 | 1,128 | 0.80 |
| 0.1% Sodium diethyldithiocarbamate | 0.816 | 1,128 | 0.75 |
| 0.1% Sodium di-n-butyldithiocarbamate | 0.904 | 1,128 | 0.790 |
| 0.1% Diethylammoniumdiethyldithiocarbamate (added as solid) | 0.728 | 1,128 | 0.570 |
| 0.1% Diethylammoniumdiethyldithiocarbamate (added as 40% aqueous solution) | 0.948 | 1,128 | 0.850 |

*Example 4*

The diethylammonium salt of diethyldithiocarbamate is prepared in situ by the addition of $CS_2$ to a dilute solution of N,N-diethylhydroxylamine and the solutions evaluated for stability as in Example 3. The following Table II indicates the results obtained:

TABLE II.—STABILIZATION OF DILUTE AQUEOUS SOLUTIONS OF N,N-DIETHYLHYDROXYLAMINE (DEHA) BY FORMATION OF DITHIOCARBAMATE IN SITU

| Additive (Based on wt. of DEHA) | Initial Percent DEHA | Hours Soln. held at 35° C. | Percent DEHA After Test |
|---|---|---|---|
| A Blank | 0.300 | 138 | 0.135 |
|  |  | 336 | 0.030 |
| 0.5% $CS_2$ | 0.328 | 138 | 0.318 |
|  |  | 336 | 0.287 |
| B Blank | 0.47 | 168 | 0.03 |
|  |  | 384 | 0.02 |
| 0.5% $CS_2$ | 0.50 | 168 | 0.45 |
|  |  | 384 | 0.43 |
| 0.25% $CS_2$ | 0.46 | 168 | 0.43 |
|  |  | 384 | 0.36 |
| 0.10% $CS_2$ | 0.60 | 168 | 0.60 |
|  |  | 384 | 0.53 |

It will be understood that numerous changes and variations may be made from the above description and examples without departing from the spirit and scope of the invention.

We claim:

1. Aqueous solutions of N,N-di-lower alkylhydroxylamines having improved storage stability consisting essentially of water, an N,N-di-lower alkylhydroxylamine and a stabilizing amount of a water soluble N,N-di-lower alkyldithiocarbamate salt.

2. An aqueous solution comprising at least about 85% by weight of an N,N-di-lower alkylhydroxylamine and from about 0.05% to about 5% by weight of a water soluble N,N-di-lower alkyldithiocarbamate salt as a stabilizer.

3. A solution as in claim 2 wherein the hydroxylamine is N,N-di-ethylhydroxylamine.

4. A solution as in claim 2 wherein the stabilizer is an alkali metal dithiocarbamate salt.

5. A solution as in claim 2 wherein the hydroxylamine is N,N-diethylhydroxylamine and the stabilizer is sodium diethyldithiocarbamate.

6. A solution as in claim 2 wherein the hydroxylamine is N,N-diethylhydroxylamine and the stabilizer is sodium diethyldithiocarbamate.

7. A process for inhibiting the decomposition of aqueous solutions of N,N-di-lower alkylhydroxylamines which comprises adding to said aqueous solution a stabilizing amount of a water soluble salt of an N,N-di-lower alkyldithiocarbamate.

8. A process as in claim 7 wherein the dithiocarbamate is formed in situ by the addition of carbon disulfide.

References Cited

UNITED STATES PATENTS 3,288,748   11/1966   Cyba _____ 260—45.85 X

CHARLES B. PARKER, *Primary Examiner.*

R. L. RAYMOND, *Assistant Examiner.*